(12) United States Patent
Nemoto et al.

(10) Patent No.: US 7,277,224 B2
(45) Date of Patent: Oct. 2, 2007

(54) BINOCULARS HAVING DISPLACEABLE OPTICAL ELEMENTS

(75) Inventors: Satoru Nemoto, Saitama-ken (JP); Ken Hirunuma, Tokyo (JP)

(73) Assignee: PENTAX Corporation, Tokyo (JP)

( * ) Notice: Subject to any disclaimer, the term of this patent is extended or adjusted under 35 U.S.C. 154(b) by 74 days.

(21) Appl. No.: 11/052,040

(22) Filed: Feb. 8, 2005

(65) Prior Publication Data

US 2005/0174632 A1 Aug. 11, 2005

(30) Foreign Application Priority Data

| Feb. 9, 2004 | (JP) | ............................ P2004-032560 |
| Feb. 9, 2004 | (JP) | ............................ P2004-032562 |
| Feb. 9, 2004 | (JP) | ............................ P2004-032563 |

(51) Int. Cl.
*G02B 23/00* (2006.01)

(52) U.S. Cl. ...................................... 359/410; 359/407

(58) Field of Classification Search ...................... None
See application file for complete search history.

(56) References Cited

U.S. PATENT DOCUMENTS

| 5,062,698 | A | 11/1991 | Funathu |
| 5,071,242 | A | 12/1991 | Yanagisawa |
| 5,196,959 | A | 3/1993 | Yanagisawa et al. |
| 5,305,141 | A | 4/1994 | Hotta |
| 5,583,692 | A | 12/1996 | Funatsu |
| 5,583,693 | A | 12/1996 | Funatsu |
| 5,930,035 | A | 7/1999 | Funatsu |
| 5,999,312 | A | 12/1999 | Funatsu |
| 6,134,048 | A | 10/2000 | Kato et al. |
| 6,226,123 | B1 | 5/2001 | No |
| 6,226,124 | B1 | 5/2001 | Enomoto et al. |
| 6,307,673 | B1 | 10/2001 | Hirunuma et al. |
| 7,099,076 | B2 * | 8/2006 | Nemoto et al. ............. 359/416 |

FOREIGN PATENT DOCUMENTS

| JP | 5-107444 | 4/1993 |
| JP | 3090007 | 7/2000 |
| JP | 3196613 | 6/2001 |

OTHER PUBLICATIONS

English Language Abstract of JP 5-107444.
U.S. Appl. No. 11/052,042 to Nemoto et al., filed Feb. 8, 2005.
U.S. Appl. No. 11/052,041 to Nemoto et al., filed Feb. 8, 2005.
U.S. Appl. No. 11/052,068 to Nemoto et al., filed Feb. 8, 2005.
U.S. Appl. No. 11/052,051 to Nemoto et al., filed Feb. 8, 2005.

* cited by examiner

*Primary Examiner*—Arnel Lavarias
(74) *Attorney, Agent, or Firm*—Greenblum & Bernstein, P.L.C.

(57) ABSTRACT

The binoculars include a pair of displaceable optical elements, which are at least parts of objective optical systems, respectively, a focusing mechanism used to move the displaceable optical elements for focusing, a pair of guide rails that guide the displaceable optical elements, respectively, when they are moved. The pair of guide rails have inclined portions, at least parts thereof, which incline with respect to the optical axes of the objective optical systems, respectively. A pair of engagement portions are formed on a pair of frames of the displaceable optical elements, respectively. The engagement portions are engaged with the guide rails, respectively. When the displaceable optical elements are moved for focusing with the pair of engagement portions being engaged with the inclined portions of the pair of guide rails, respectively, a distance between the optical axes of the pair of displaceable optical elements changes, thereby a convergence value being compensated.

11 Claims, 12 Drawing Sheets

Infinity focused state

Shortest distance focused state

W=Constant

W < W'

BINOCULARS HAVING DISPLACEABLE OPTICAL ELEMENTS

BACKGROUND OF THE INVENTION

The present invention relates to binoculars.

When an object at infinity is observed by a pair of binoculars, a field of view observed by a left eye of an observer and a field of view observed by the right eye substantially overlap each other, and a single field of view is observed when the observer observes the binoculars with both eyes. When an object at a relatively short distance of several meters or less is observed with the binoculars, only a part of the field of view for each of the right eye and left eye overlaps each other, and the observer feels difficulty in observing such an object. This is because, in binoculars, the optical axes of left and right objective lenses are generally fixed to be parallel to each other since the binoculars are generally designed to observe an object located within a range from several tens of meters to infinity. If an object at a short distance is observed with such binoculars, a remarkable discrepancy arises between a focusing condition corresponding to the object (which will be referred to as an adjustment value, i.e., a distance to an object to be focused, for example, represented by a unit of diopter [dptr]=[1/meter]) and convergence value (which is a distance at which a right sight line and a left sight line cross, for example, represented by metric angle [MW]=[1/meter]). When an object is observed at high magnifying power, an influence due to such discrepancy is remarkable. For example, with ten-power binoculars, the degree of discrepancy is ten times in comparison with the degree of discrepancy of naked eyes. The remarkable discrepancy between the adjustment value and convergence value is a burden to the eyes of the observer and causes the eyes to be fatigued. (It should be noted that the term "convergence" means the visual axes of both eyes which are concentrated when observing an object at a short distance, and the angle formed between both axes is referred to as a "convergence angle").

In view of the above-described problem, in order to reduce the burden to the eyes when observing an object at a short distance, binoculars provided with a convergence value (convergence angle) compensating mechanism have been developed. In such binoculars, in accordance with the adjustment value, the convergence value (or convergence angle) is adjusted by moving both objective lenses in the direction orthogonal to the optical axes thereof to make the objective lenses located close to each other when observing an object at a short distance. Examples of such binoculars are disclosed in Japanese Patent Publications No. 3090007, No. 3196613 and No. 3189328. However, the structure of a convergence value compensating mechanism of the binoculars described in each of the patent publications is relatively complicated.

For example, the mechanism shown in FIG. 8 of publication No. 3196613 is configured such that the objective lens is moved along two upper and lower guide rods and an auxiliary rod. In this mechanism, the guide rods and auxiliary rod should be prepared separately from a lens frame of each objective lens and implemented in the lens frame. In such a configuration, the number of components is increased, manufacturing and assembling thereof are relatively difficult, and thus the manufacturing costs increases. In addition, since each of the guide rods and auxiliary rod is straight, the inclination angle should be made constant. Therefore, it is difficult to optimally compensate for the convergence value in accordance with a focusing operation.

In the mechanism shown in FIG. 4 of publication No. 3196613, the objective lens is supported in the objective lens frame so as to be movable in a direction perpendicular to the optical axis direction, and the objective lens frame is movably supported in the lens barrel. In the mechanism, it is necessary to provide at least a triple structure in which the lens frames, objective lens frame and lens barrel are employed, thereby resulting in complication and upsizing.

The mechanism shown in FIG. 8 of publication No. 3090007 compensates for the convergence value by moving a prism using a cam. The structure requires, however, two separate actuation mechanisms, including an actuation mechanism for focusing. Therefore, the structure is complicated.

SUMMARY OF THE INVENTION

The present invention is advantageous in that binoculars capable of compensating for the convergence value with a relatively simple structure but at a high accuracy in accordance with an adjustment value when observing an object at a short distance are provided.

According to an aspect of the invention, there is provided binoculars which include a pair of observation optical systems each having an objective optical system, an erecting optical system and an eyepiece optical system. The binoculars include a main body that accommodates a pair of displaceable optical elements, which are at least parts of the objective optical systems, respectively, a focusing mechanism that is used to move the pair of displaceable optical elements for focusing, a pair of guide rails that guide the pair of displaceable optical elements, respectively, when the pair of displaceable optical elements are moved by actuation of the focusing mechanism, the pair of guide rails being formed with inclined portions which incline with respect to the optical axes of the objective optical systems at least parts thereof, respectively, and a pair of engagement portions formed on a pair of frames that respectively hold the pair of displaceable optical elements, the pair of engagement portions being engaged with the pair of guide rails, respectively. When the pair of displaceable optical elements are moved for focusing with the pair of engagement portions being engaged with the inclined portions of the pair of guide rails, respectively, a distance between the optical axes of the pair of displaceable optical elements changes, thereby a convergence value being compensated.

Optionally, each of the guide rails is a groove formed on the main body. Alternatively, the guide rail may be a convex line or a gap (stepped portion), integrally provided (i.e., integrally formed or integrally secured) on the main body.

Further optionally, each of the pair of observation optical system may be configured such that an incidence side optical axis and an emission side optical axis with respect to the erecting optical system are shifted from each other by a predetermined distance. Then, the binoculars may further include a left barrel containing the left eyepiece optical system and the left erecting optical system, the left barrel being turnable, with respect to the main body, about the left incidence side optical axis of the eyepiece optical system, and a right barrel containing the right eyepiece optical system and the right erecting optical system, the right barrel being turnable, with respect to the main body, about the right incidence side optical axis of the eyepiece optical system. Further, the distance between the emission side optical axes of the pair of eyepiece optical systems is made adjustable by turning the left barrel and right barrel with respect to the main body.

Optionally, each of the pair of guide rails may have a portion in which the inclination, with respect to the optical axis of the objective optical system, changes along a lengthwise direction thereof.

In this case, the pair of guide rails may have parallel portions which are parallel to the optical axes of the objective optical systems, respectively.

In a particular case, the binoculars may further include an urging member that urges the pair of engagement portions to be press-contacted on side walls of the pair of guide rails, respectively.

Still optionally, each of the pair of displaceable optical elements may be configured to be turnable about an axis parallel to the optical axis thereof, and the pair of guide rails may be configured to have portions which guide the pair of displaceable optical elements to move for focusing and further to turn about the optical axes thereof, respectively.

In the above case, the binoculars may further include a pair of guide shafts that serve as turning centers of the pair of displaceable optical elements, respectively, the pair of guide shafts being fixed to the main body. Further, at least one end of each of the pair of guide shafts may be directly fixed to the main body.

Optionally, the binoculars may be provided with markers indicating positions of the pair of displaceable optical elements corresponding to an infinity focused state.

According to another aspect of the invention, there is provided binoculars which include a pair of observation optical systems each having an objective optical system, an erecting optical system and an eyepiece optical system. The binocular includes a pair of displaceable optical elements, which are at least parts of the objective optical systems, respectively, a focusing mechanism that is used to move the pair of displaceable optical elements for focusing, a pair of guide shafts corresponding to the pair of displaceable optical elements, each guide shaft of the pair of guide shafts being arranged in parallel with a corresponding displaceable optical element, each guide shaft of the pair of guide shafts guiding a corresponding displaceable optical element when moved by actuation of the focusing mechanism, the pair of guide shafts serving as turning centers of the corresponding object displacement elements, respectively, a pair of engaging portions formed on a pair of frames that hold the pair of displaceable optical elements, respectively, and a pair of guide rails provided with respect to the pair of displaceable optical elements, respectively, the pair of engaging portions being slidably engaged with the pair of guide rails, respectively, the pair of guide rails having inclined portions that incline with respect to the optical axes of the pair of displaceable optical elements at at least parts thereof, respectively.

When the pair of displaceable optical elements are moved for focusing with the pair of engaging portions being engaged with the inclined portions of the pair of guide rails, respectively, a distance between the optical axes of the pair of displaceable optical elements changes, thereby a convergence value being compensated.

Optionally, the pair of engaging portions may have a pair of protrusions formed on the pair of frames, respectively, and the pair of guide rails may be formed as a pair of guide grooves respectively, the pair of protrusions being inserted in and slidably engaged -with the pair of guide grooves, respectively.

Further, the projections may be formed to have substantially spherical surfaces at portions which contact inner surfaces of the guide grooves, respectively.

Also in this case, each of the pair of observation optical system may be configured such that an incidence side optical axis and an emission side optical axis with respect to the erecting optical system are shifted from each other by a predetermined distance. Further, the binoculars may include a left barrel containing the left eyepiece optical system and the left erecting optical system, the left barrel being turnable, with respect to a main body, about the left incidence side optical axis of the eyepiece optical system, and a right barrel containing the right eyepiece optical system and the right erecting optical system, the right barrel being turnable, with respect to the main body, about the right incidence side optical axis of the eyepiece optical system. Further, the distance between the emission side optical axes of the pair of eyepiece optical systems may be made adjustable by turning the left barrel and right barrel with respect to the main body.

Optionally, each of the pair of guide grooves may have a constant width along a lengthwise direction thereof.

Further optionally, the cross-sectional inner shape on a plane perpendicular to a lengthwise direction of each of the pair of guide grooves may be U-shaped.

Furthermore, each of the pair of projections may have a reinforcement part that enhances the strength of each projection at sides of the spherical surface.

Still optionally, each of the pair of projections may include a plate-shaped portion whose thickness is thinner than the width of corresponding guide groove and a spherical portion swelling to be spherical from both sides of the plate-shaped portion, and the plate-shaped portion may be shaped not to contact the inner surface of the guide groove, the spherical portion contacting inner surfaces of the corresponding guide groove.

Optionally, each of the guide rails may be one of a groove, a convex line or a stepped structure.

The binoculars may be configured such that, when viewed along the optical axes of the pair of objective optical systems, lines connecting the engaging portions and centers of the pair of guide shafts pass in the vicinities of the centers of the pair of displaceable optical elements, respectively.

Further optionally, each of the pair of observation optical system may be configured such that an incidence side optical axis and an emission side optical axis with respect to the erecting optical system are shifted from each other by a predetermined distance. Further, the binoculars may include a left barrel containing the left eyepiece optical system and the left erecting optical system, the left barrel being turnable, with respect to the main body, about the left incidence side optical axis of the eyepiece optical system, and a right barrel containing the right eyepiece optical system and the right erecting optical system, the right barrel being turnable, with respect to the main body, about the right incidence side optical axis of the eyepiece optical system. Further, the distance between the emission side optical axes of the pair of eyepiece optical systems may be made adjustable by turning the left barrel and right barrel with respect to the main body.

Further, the binoculars may be configured such that, when viewed in the optical axes direction of the objective optical systems, a distance from the center of each of the pair of displaceable optical elements to the center of the corresponding one of the pair of guide shafts is longer than the distance from the center of the displaceable optical element to the engagement portion.

Optionally, the focusing mechanism may include a focusing ring which is manually operable, and, when viewed in the optical axis direction of each of the objective optical systems, the distance from the center of the focusing ring to the center of corresponding one of the pair of guide shafts may be shorter than the distance from the center of the focusing ring to the engagement portion.

Still optionally, the focusing mechanism may include a focusing ring which is manually operable, and, when viewed in the optical axis direction of the pair of objective optical systems, the pair of guide shafts may be arranged at substantially the same height as that of the focusing ring with respect to the vertical direction of the binoculars.

BRIEF DESCRIPTION OF THE ACCOMPANYING DRAWINGS

DETAILED DESCRIPTION OF THE EMBODIMENTS

Hereinafter, binoculars according to embodiments of the present invention will be described in detail with reference to the accompanying drawings.

First Embodiment

Figure 1:
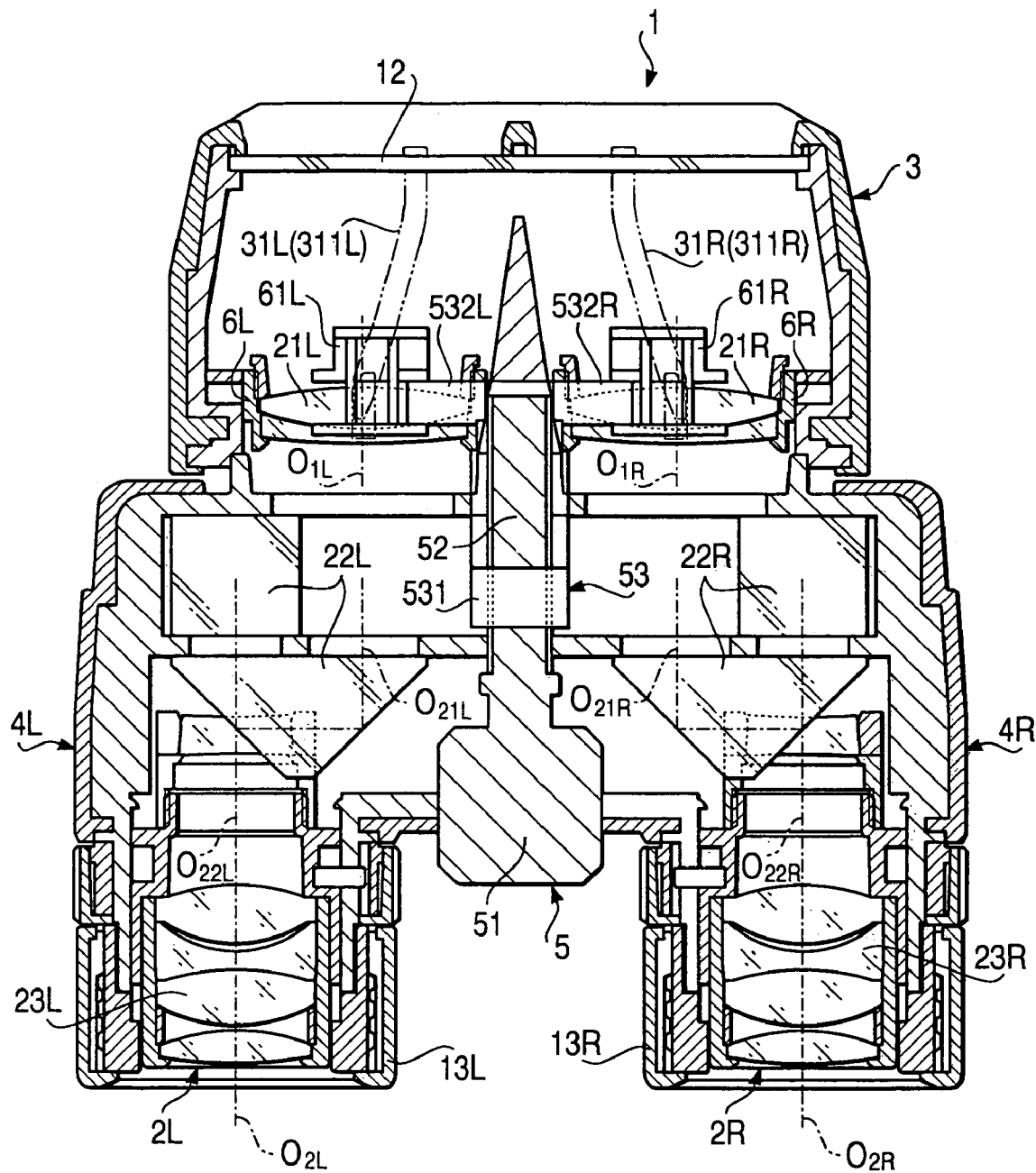
FIG. 1 is a sectional plan view of binoculars according to a first embodiment of the invention in an infinity-focused state.
Figure 2:
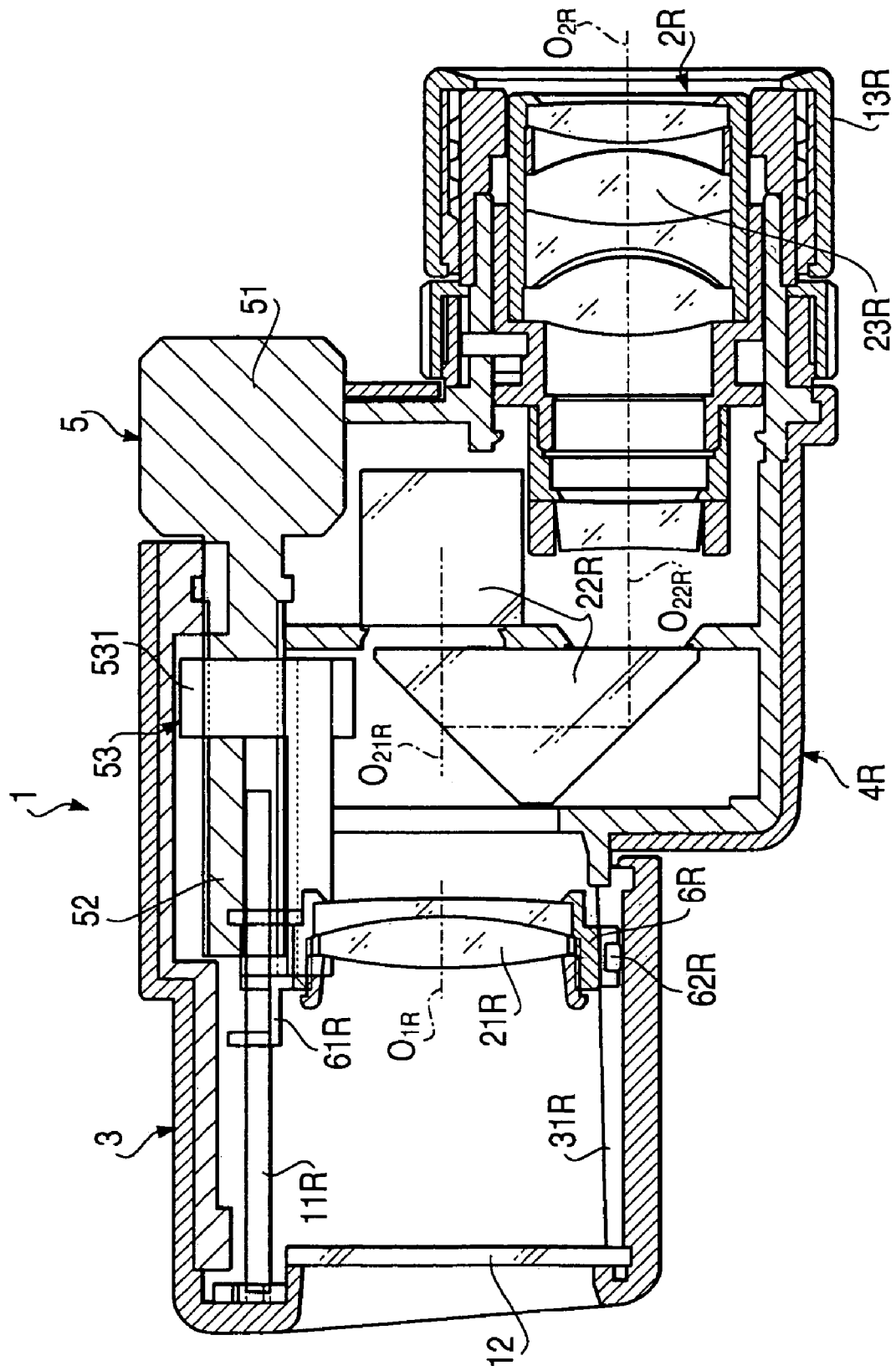
FIG. 2 is a sectional side view of the binoculars according to the first embodiment of the invention in an infinity-focused state.
Figure 3:
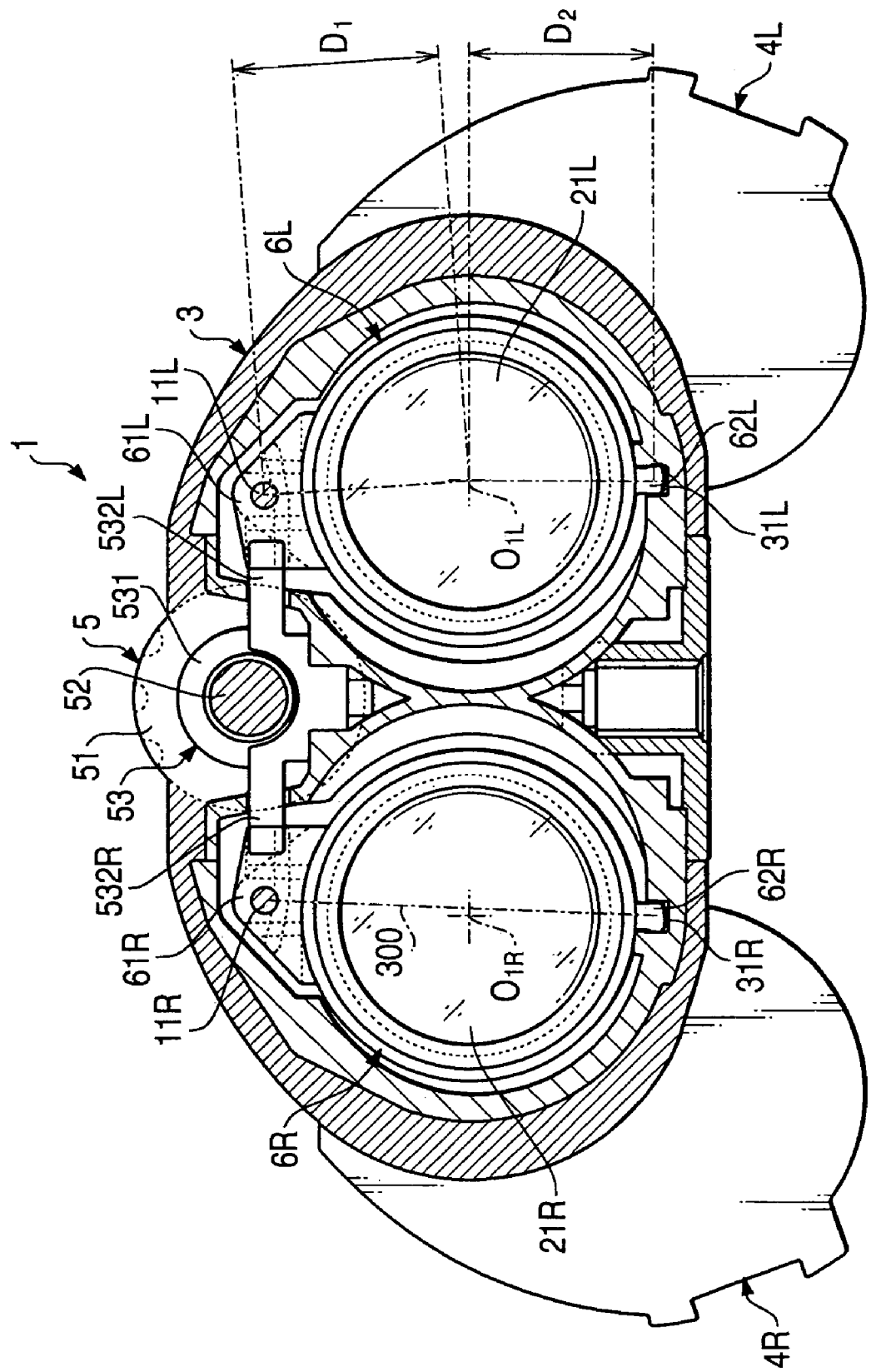
FIG. 3 is a sectional front view of the binoculars according to the first embodiment of the invention in an infinity-focused state.
Figure 4:
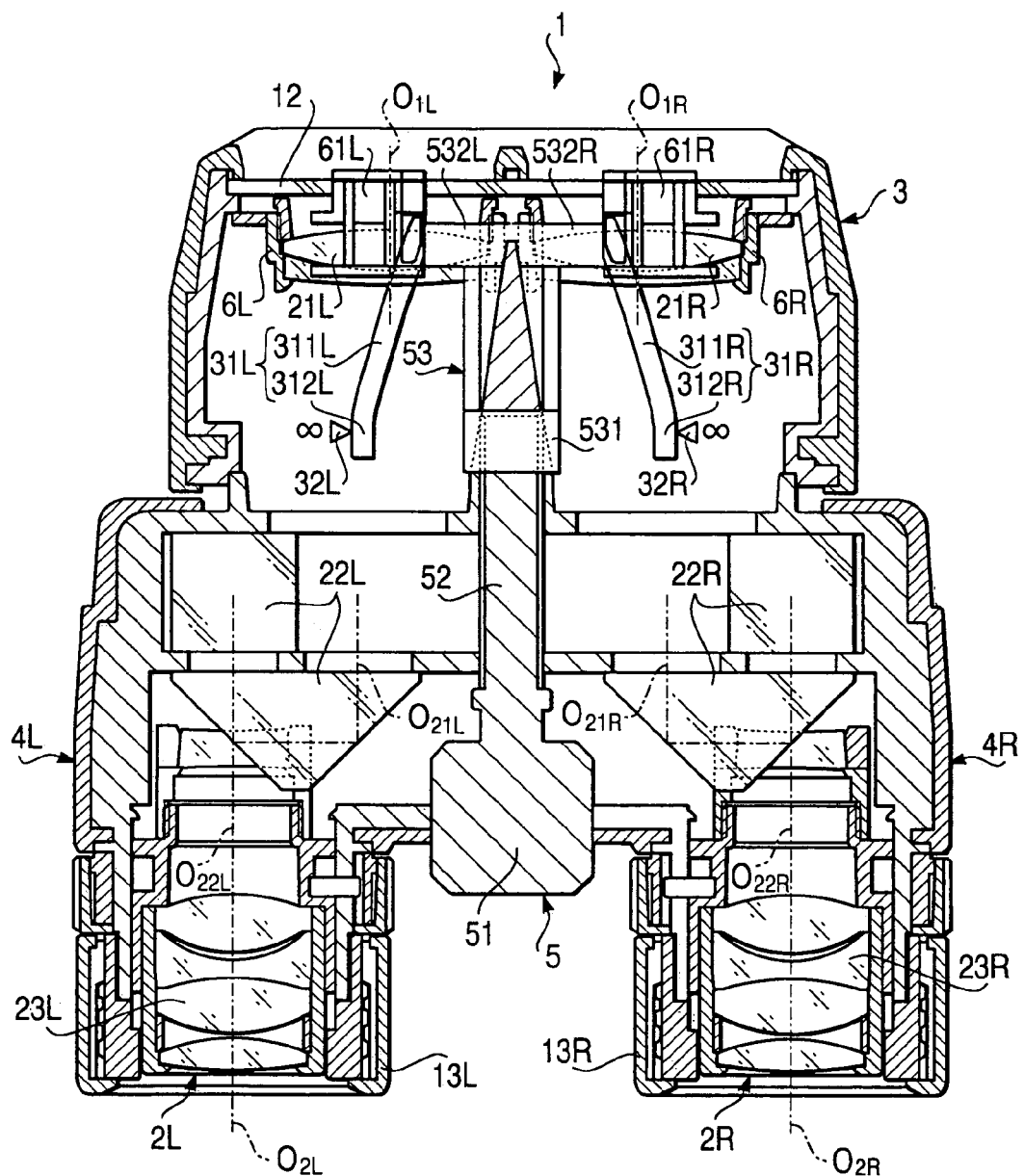
FIG. 4 is a sectional plan view of the binoculars according to the first embodiment of the invention in a shortest distance focused state.
Figure 5:
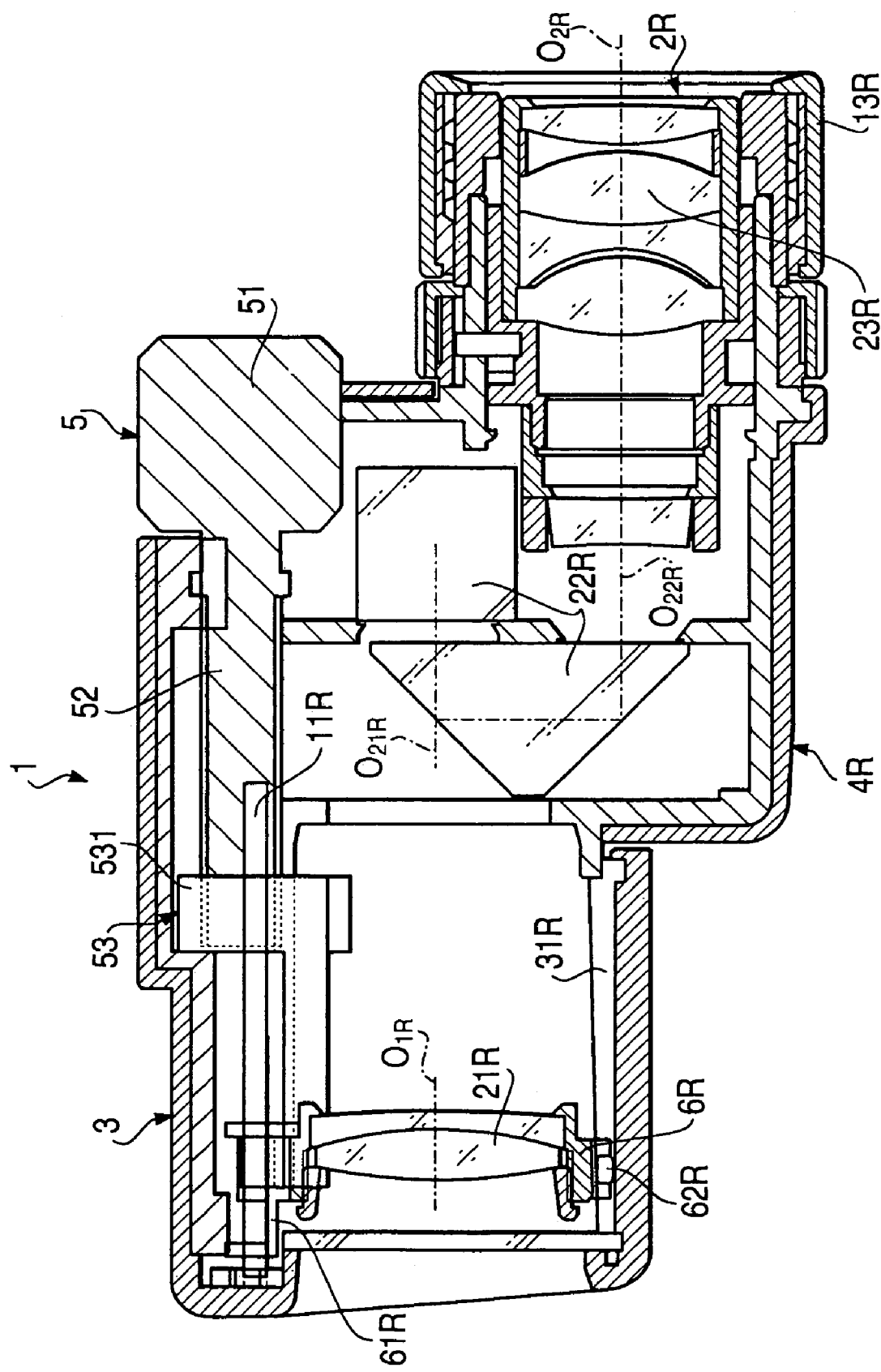
FIG. 5 is a sectional side view of the binoculars according to the first embodiment of the invention in a shortest distance focused state.
Figure 6:
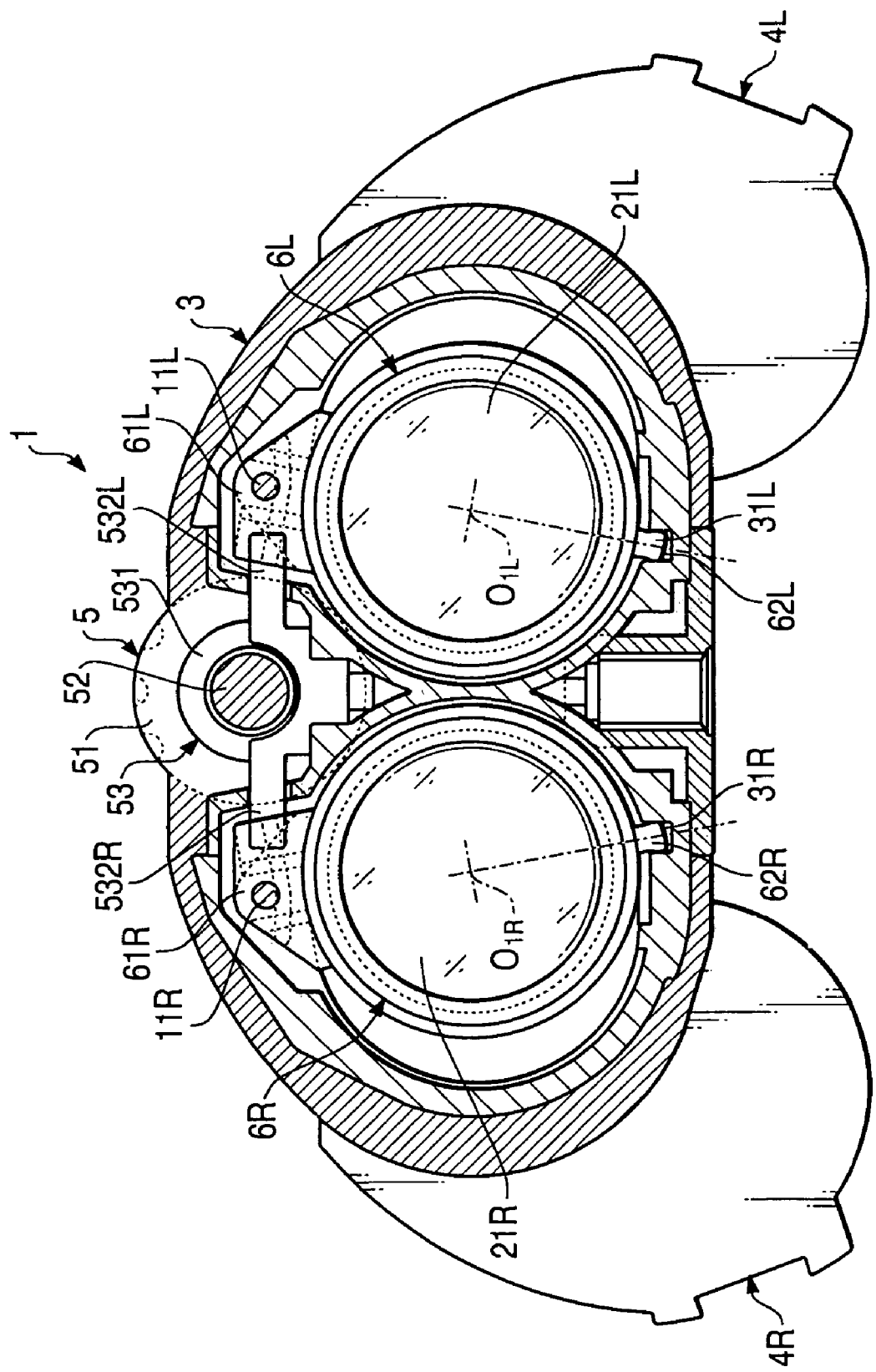
FIG. 6 is a sectional front view of the binoculars according to the first embodiment of the invention in a shortest distance focused state.
Figure 7:
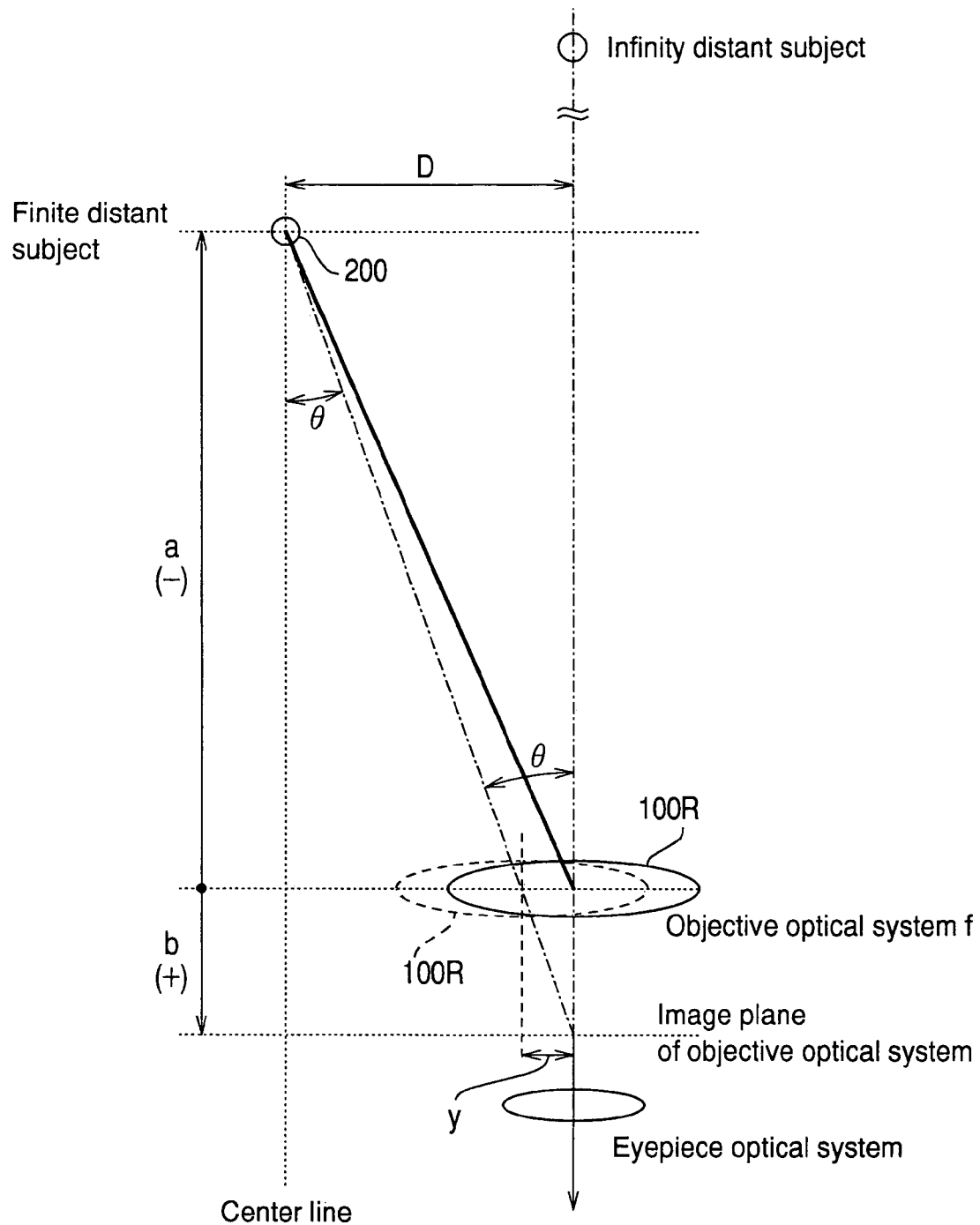
FIG. 7 is an exemplary view showing displacement amounts of the objective optical systems, which are necessary for convergence value compensation.
Figure 8:
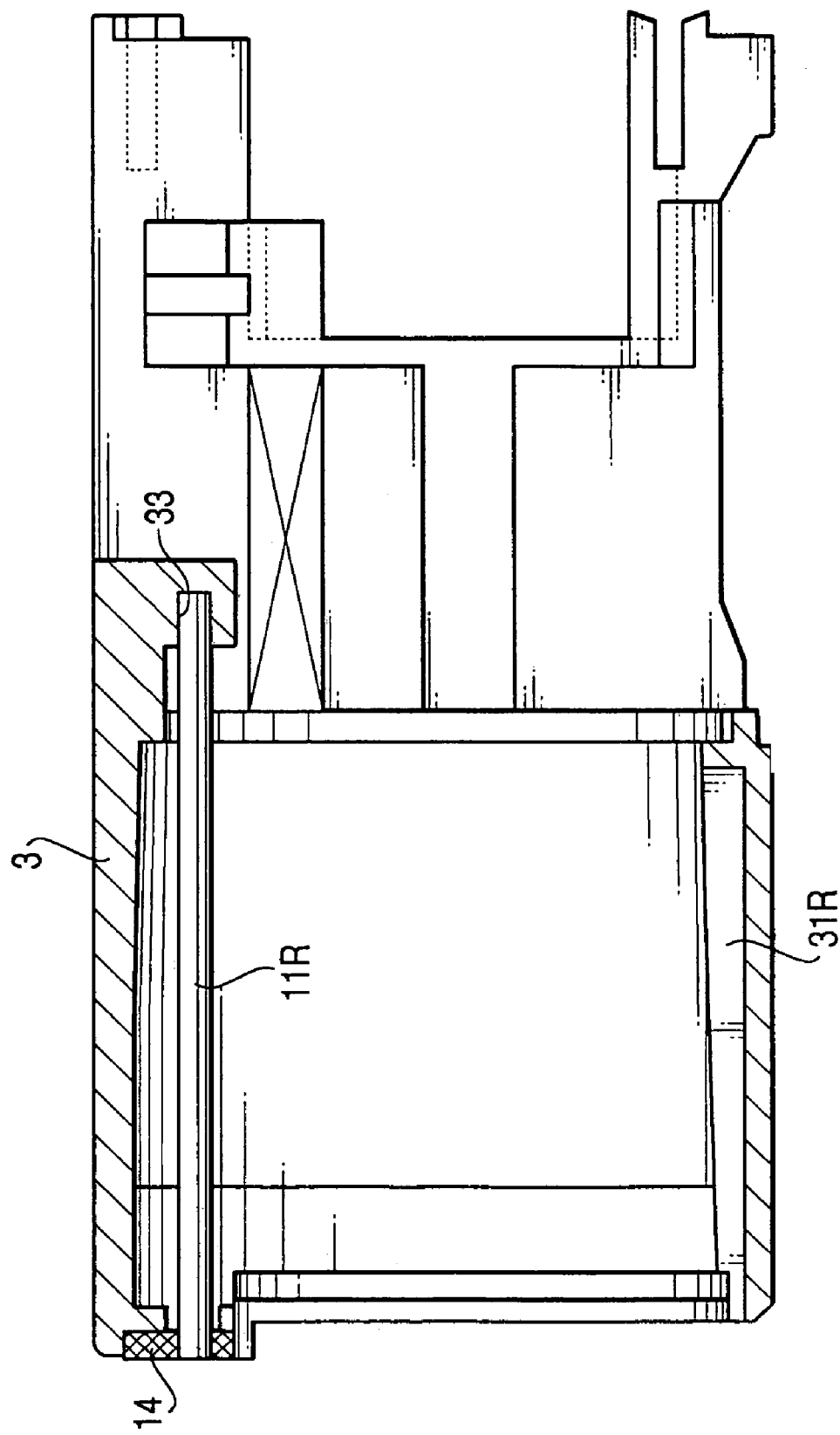
FIG. 8 is a sectional side view showing the main body with outer-fitted components removed.

FIG. 1, FIG. 2 and FIG. 3 are cross-sectional plan view, cross-sectional side view and cross-Sectional front view of binoculars according to a first embodiment of the invention when the binoculars are focused on an object at infinity (hereinafter, the state will be referred to as the "infinity focused state"). FIG. 4, FIG. 5 and FIG. 6 are sectional plan view, sectional side view and sectional front view when the binoculars according to the first embodiment of the invention are focused to an object at its shortest distance (hereinafter, the state will be referred to as the "shortest distance focused state"). FIG. 7 is an exemplary view showing displacement amounts of objective optical systems necessary to compensate for a convergence value. FIG. 8 is a sectional side view of the main body in a state in which outer-fitted components thereof are removed.

It should be noted that, in this specification, the upper side in FIG. 1 and the left-hand side in FIG. 2 are referred to as a "front" side of the binoculars, the lower side in FIG. 1 and the right-hand side in FIG. 2 are referred to as a "rear" side of the binoculars 1, the upper side in FIG. 2 and FIG. 3 is referred to as the "up or upside" and the lower side therein is referred to as the "down or downside" of the binoculars 1.

As shown in FIG. 1, the binoculars 1 include an observation optical system 2L for the left eye, an observation optical system 2R for the right eye, a main body 3 which is a casing for accommodating the above-described observation optical systems 2L, a left barrel 4L and a right barrel 4R, and a focusing mechanism 5 used for focusing in accordance with an object distance.

The observation optical systems 2L and 2R have objective optical systems 21L and 21R, erecting optical systems 22L and 22R and eyepiece optical systems 23L and 23R, respectively. The erecting optical systems 22L and 22R in the observation optical systems 2L and 2R are composed of Porro prisms, respectively. A predetermined gap (spacing) is formed between the incidence side optical axes $O_{21L}$ and $O_{21R}$ of the eyepiece optical systems 23L and 23R with respect to the erecting optical systems 22L and 22R and the emission side optical axes $O_{22L}$ and $O_{22R}$ thereof. In the infinity focused state, the optical axes $O_{1L}$ and $O_{1R}$ of the objective optical systems 21L and 21R coincide with the incidence side optical axes $O_{21L}$ and $O_{21R}$, respectively.

Both the objective optical systems 21L and 21R are integrally installed in the main body 3. The left side eyepiece optical system 23L and erecting optical system 22L, and the right side eyepiece optical system 23R and erecting optical system 22R are installed in the left barrel 4L and right barrel 4R which are separated from each other. The main body 3, left barrel 4L and right barrel 4R may be composed of a single part or may be composed of a plurality of combined parts.

The left barrel 4L and right barrel 4R are coupled to the main body 3 so as to turn within a predetermined angular range about the incidence side optical axes $O_{21L}$ and $O_{21R}$, respectively. Further, the barrels 4L and 4R can be held at any positions within the predetermined angular range by friction.

By turning the left barrel 4L and right barrel 4R in opposite directions, the distance between the optical axes $O_{2L}$ and $O_{2R}$ (distance between the emission side optical axes $O_{22L}$ and $O_{22R}$) of both the eyepiece optical systems 23L and 23R can be adjusted to meet the width between the eyes of the observer. It is preferable that the binoculars 1 are provided with an interlock mechanism (not illustrated) by which the left barrel 4L and right barrel 4R turn in opposite directions simultaneously with each other.

In the composition as illustrated, a cover glass 12 is provided in the window part opening forward of the main body 3. With this configuration, foreign substances or dusty substances are prevented from entering the main body 3. The cover glass 12 may be omitted.

At the rear end portions of the barrels 4L and 4R, eyepiece members 13L and 13R are secured concentrically with the eyepiece optical systems 23L and 23R, respectively. The eyepiece members 13L and 13R are displaceable in the directions of the optical axes $O_{2L}$ and $O_{2R}$, that is, movable from the accommodated state shown in FIG. 1 to a state (not illustrated) where the eyepiece members 13L and 13R are drawn rearward. The user adjusts the positions of the eyepiece members 13L and 13R depending on the presence/absence of glasses or facial features, and then looks into the eyepiece optical systems 23L and 23R circumocularly or with his/her glasses abutted against the rearward end surface of the eyepiece members 13L and 13R. With this configuration, the user can place his/her eyes at appropriate eye points (the positions where all the fields of view can be seen without being shielded) in a stable state.

The objective optical systems 21L and 21R are made movable with respect to the main body 3, and are moved by actuation of the focusing mechanism 5. As shown in FIG. 2 and FIG. 3, the main body 3 is provided with a pair of guide shafts 11L and 11R and guide grooves (guide rails) 31L and 31R for guiding movement of the objective optical systems 21L and 21R, respectively.

Each of the guide shafts 11L and 11R is composed of a straight rod. The guide shafts 11L and 11R are arranged on the upper side of the objective optical systems 21L and 21R, extending in parallel with the optical axes $O_{1L}$ and $O_{1R}$. As shown in FIG. 3, protruded portions 61L and 61R formed on the upside portions of the lens frames 6L and 6R for retaining the objective optical systems 21L and 21R have holes, through which the guide shafts 11L and 11R are inserted. With this configuration, the objective optical systems 21L and 21R are movable along the guide shafts 11L and 11R, and are turnable about the guide shafts 11L and 11R, respectively.

The guide rails 31L and 31R are composed of grooves formed on the inner wall on the lower side of the main body 3. Projections (engagement portions) 62L and 62R, which are inserted into the guide grooves 31L and 31R, are formed downward portions of the lens frames 6L and 6R. As the objective optical systems 21L and 21R are moved along the guide shafts 11L and 11R, the projections 62L and 62R are moved along the guide grooves 31L and 31R, respectively.

As shown in FIGS. 3 and 6, cross sectional shapes of the guide rails (grooves) 31L and 31R are substantially rectangular (U-shaped) having inner walls (side walls) which are parallel with each other and extend in up and down direction.

As shown in FIG. 1, the focusing mechanism 5 includes a turning ring (focusing ring) 51 which serves as an operable member, a focusing ring shaft 52 which turns along with the focusing ring 51 and a vane 53. Both the focusing ring 51 and focusing ring shaft 52 are located between the observation optical systems 2L and 2R in the plan view and are rotatably supported on the main body 3. The vane 53 is provided with a base portion 531 having a female thread which is engaged with a male thread formed on the outer circumferential surface of the focusing ring shaft 52. The vane 53 is further provided with arms 532L and 532R protruding leftward and rightward from the proximal portion 531, respectively. The tip end portions of the arms 532L and 532R are inserted into grooves formed in the protruded portions 61L and 61R of the lens frames 6L and 6R.

If the focusing ring 51 is rotated in a predetermined direction, the proximal portion 531 advances along the direction where the focusing ring shaft 52 extends. Then, the force is transmitted to the lens frames 6L and 6R via the arms 532L and 532R to cause the objective optical systems 21L and 21R to protrude forward. If the focusing ring 51 is turned in the direction opposite to the predetermined direction, the objective optical systems 21L and 21R are caused to be retracted rearward. With such actuation of the focusing mechanism 5, focusing can be carried out.

In the infinity focused state shown in FIG. 1 and FIG. 3, the objective optical systems 21L and 21R are in a rearward retracted state (i.e., fully retracted rearward).

To the contrary, in the shortest distance focused state shown in FIG. 4 through FIG. 6, the objective optical systems 21L and 21R are fully protruded forward. The shortest focusing distance of the binoculars 1 can be obtained in this state. The shortest focusing distance is not limited to a specific value. However, as described below, since the binoculars 1 according to the invention are provided with a convergence value compensation mechanism and are suitable for short distance observation, it is preferable that the shortest focusing distance is relatively short in comparison with conventional binoculars, which distance is, for example, 0.3 m through 1 m in range.

The binoculars 1 are provided with a convergence value compensation mechanism for compensating for the convergence value by varying the distance between the optical axes $O_{1L}$ and $O_{1R}$ of the objective optical systems 21L and 21R in association with the operation of the focusing mechanism 5. In the first embodiment, the convergence value compensation mechanism is composed of the guide shafts 11L and 11R, guide rails (grooves) 31L and 31R and projections 62L and 62R as described above. Hereinafter, a description is given of compensation for the convergence value in the binoculars 1 according to the first embodiment.

As shown in FIG. 4, the guide rails (grooves) 31L and 32R are provided with inclined portions 311L and 311R extending along a direction inclined with respect to the optical axes $O_{1L}$ and $O_{1R}$ of the objective optical systems 21L and 21R, and parallel portions 312L and 312R continuously formed rearward of the inclined portions 311L and 311R and extending in parallel to the optical axes $O_{1L}$ and $O_{1R}$, respectively. The inclined portions 311L and 311R are inclined such that the inclined portions 311L and 311R become closer to each other toward the forward direction. Markers 32L and 32R indicating the positions of the objective optical systems 21L and 21R in the infinity focused state are provided sideward at a predetermined position along the parallel portions 312L and 312R.

When the projections 62L and 62R are located at the parallel portions 312L and 312R, even if the focusing mechanism 5 is operated and the objective optical systems 21L and 21R are moved, the distance between the optical axes $O_{1L}$ and $O_{1R}$ does not change. That is, no convergence value compensation is effected in the vicinity of the infinity focused state. It is because, when observing an object at a relatively far distance, the convergence value correction is unnecessary.

When the projections 62L and 62R are located at the inclined portions 311L and 311R, as the focusing mechanism 5 is operated and objective optical systems 21L and 21R is advanced, the projections 62L and 62R approach the center along the inclined portions 311L and 311R, respectively. Thus, the objective optical systems 21L and 21R are rotated about the guide shafts 11L and 11R, respectively, and the distance between the optical axes $O_{1L}$ and $O_{1R}$ is gradually reduced, thereby the convergence value being compensated for (see FIG. 3 and FIG. 6).

Since the convergence value is compensated as described above, a difference between an image observed by the left eye and an image observed by the right eye when observing a short distance object can be prevented, and the observation becomes easy and comfortable.

Although there is no special limitation with respect to the focusing distance (adjustment value) at which convergence value compensation is effected, it is preferable that the distance is 3 m through 5 m. The boundary points between the inclined portions 311L and 311R and the parallel portions 312L and 312R in the guide rails 31L and 31R are set at positions corresponding to the focusing distance at which the convergence value compensation is effected.

The binoculars 1 described above is configured such that the guide rails 31L and 31R are composed of grooves formed on the inner wall of the lower side of the main body 3 and are integrated with the main body 3. Therefore, the number of components can be reduced, and assembling thereof can be facilitated. Accordingly, it is possible to incorporate the convergence value compensation mechanism while preventing an increase in the production costs thereof. Further, since the structure is simplified and the guide rails 31L and 31R can easily be formed at a high dimensional accuracy, it is possible to carry out convergence value compensation at a higher accuracy.

Furthermore, according to the above-described configuration, the guide rails 31L and 31R can be formed by molding. Therefore, it is possible to freely design the inclination angles of the guide rails 31L and 31R with respect to the optical axes $O_{1L}$ and $O_{1R}$, and it is possible to change the inclination angles easily on the way, for example, at the boundary point between the inclination portions 311L and 311R and the parallel portions 312L and 312R. Therefore, it is possible to carry out convergence value compensation at the optimal conditions.

In the first embodiment, the guide rails 31L and 31R are composed of grooves. However, the invention need not be limited to this configuration and can be modified. That is, the guide rails 31L and 31R may be composed of convex lines and the lens frames 6L and 6R may be provided with grooves, into which the convex lines are inserted.

Although it is most preferable that the guide rails 31L and 31R are integrally formed on the main body 3 as in the first embodiment, rails composed as separate components may be fixed and adhered to the main body 3 by an adhering method.

Further, as described above, in the binoculars 1 according to the first embodiment, markers 32L and 32R are provided on the main body 3 (see FIG. 4). The markers 32L and 32R are signs which are referred to for locating the objective optical systems 21L and 21R at the positions corresponding to the infinity focused state when assembling (producing) the binoculars 1. When assembling the observation optical systems 2L and 2R in assembling (producing) process of the binoculars 1, the objective optical systems 21L and 21R are first located at the positions of the markers 32L and 32R, and the position where the infinity focused state is obtained is searched by moving the eyepiece optical systems 23L and 23R in the direction of the optical axes $O_{2L}$ and $O_{2R}$ in the above-described state. Then, the eyepiece optical systems 23L and 23R are fixed in the position corresponding to the infinity focused state. By this assembly, it is possible to prevent individual differences of the focusing distance at which the convergence value compensation is commenced, and the convergence value compensation can be accurately carried out.

As shown in FIG. 8, the front end parts of the guide shafts 11L and 11R are fixed on the main body 3 via bearing members 14. The rear end parts of the guide shafts 11L and 11R are directly fixed onto the main body 3 by being pressure-fitted in holes 33 formed in the main body 3.

In the first embodiment, since the guide shafts 11L and 11R are fixed to the main body 3 as described above, the guide shafts 11L and 11R are firmly fixed without any positional error, the durability thereof can be improved. Therefore, even though a shock is applied to the binoculars or the binoculars are used for ages, the accuracy in convergence value compensation and focusing can be maintained, and a disorder of the binoculars will not occur. In particular, in the first embodiment, since the rear end portions of the guide shafts 11L and 11R are directly fixed to the main body 3 and are not composed of additional components for fixation, the dimensions thereof are stabilized and a higher accuracy can be obtained. Further, such a structure contributes to simplification of the structure, and the assembly can be further facilitated and the manufacturing costs thereof can be reduced. Optionally, the front end portions of the guide shafts 11L and 11R may be directly fixed to the main body 3.

Furthermore, as shown in FIG. 1, the binoculars 1 according to the first embodiment are configured such that, in use, the distance between the optical axes $O_{1L}$ and $O_{1R}$ of the objective optical systems 21L and 21R is always shorter than the distance between the optical axes $O_{2L}$ and $O_{2R}$ of the eyepiece optical systems 23L and 23R (distance between the emission side optical axes $O_{22L}$ and $O_{22R}$). In other words, the maximum value of the distance between the optical axes $O_{1L}$ and $O_{1R}$ of the objective optical systems 21L and 21R (the state shown in FIG. 1) is made smaller than the distance between the optical axes $O_{2L}$ and $O_{2R}$ of the eyepiece optical systems 23L and 23R (the distance between the emission side optical axes $O_{22L}$ and $O_{22R}$) in a state where the eye-width distance is adjusted to the minimum value (however, this refers to a state usable as binoculars and does not include a unusable, fully retracted state)

As described above, in the binoculars 1 according to the first embodiment, an objective optical system turning method is employed, in which the distance between the optical axes $O_{1L}$ and $O_{1R}$ is varied by turning the objective optical systems 21L and 21R centering around the guide axes 11L and 11R when compensating for the convergence value. It should be noted that the objective optical systems 21L and 21R are not translated (i.e., moved in parallel) in the right and left directions. Therefore, the structure can be simplified, which contributes to a decrease in the number of components and facilitation of assembling process, thereby the manufacturing costs thereof being reduced.

As shown in FIG. 3, when viewed from the direction of the optical axis $O_{1R}$ of the objective optical system 21R, a line segment 300 connecting the projection 62R with the center of the guide shaft 11R passes in the vicinity of the center of the objective optical system 21R, i.e., in the vicinity of the optical axis $O_{1R}$. Similarly, although not shown, a line segment connecting the projection 62L with the center of the guide shaft 11L passes in the vicinity of the center of the objective optical system 21L, i.e., in the vicinity of the optical axis $O_{1L}$. With such a configuration, even if there is an error in manufacturing and/or assembling process, the influence of such an error on the optical performance of the objective optical systems 21R and 21L can be minimized. That is, the positional variation of the optical axes $O_{1L}$ and $O_{1R}$ can be minimized, and the convergence value compensation can be carried out at a high accuracy.

Further, when viewed along the direction of the optical axis $O_{1L}$ of the objective optical system 21L, the distance $D_1$ from the center (optical axis $O_{1L}$) of the objective optical system 21L to the center of the guide shaft 11L is longer than the distance $D_2$ from the center (optical axis $O_{1L}$) of the objective optical system 21L to the projection 62L. The objective optical system 21R has the similar configuration.

When the objective optical systems 21L and 21R are turned about the guide shafts 11L and 11R for the convergence value compensation, the optical axes $O_{1L}$ and $O_{1R}$ are slightly displaced in the vertical direction. However, by setting the distance $D_1$ to be relatively long as described above, the displacement of the optical axes $O_{1L}$ and $O_{1R}$ in the vertical direction can be suppressed, which contributes to improvement of the accuracy of the convergence value compensation.

As an alternative, in order to obtain longer distance $D_1$ from the centers of the objective optical systems 21L and 21R to the centers of the guide shafts 11L and 11R, a window portion may be formed on the upper surface of the main body 3 and the guide shafts 11L and 11R are arranged outside the main body 3.

Figure 9:
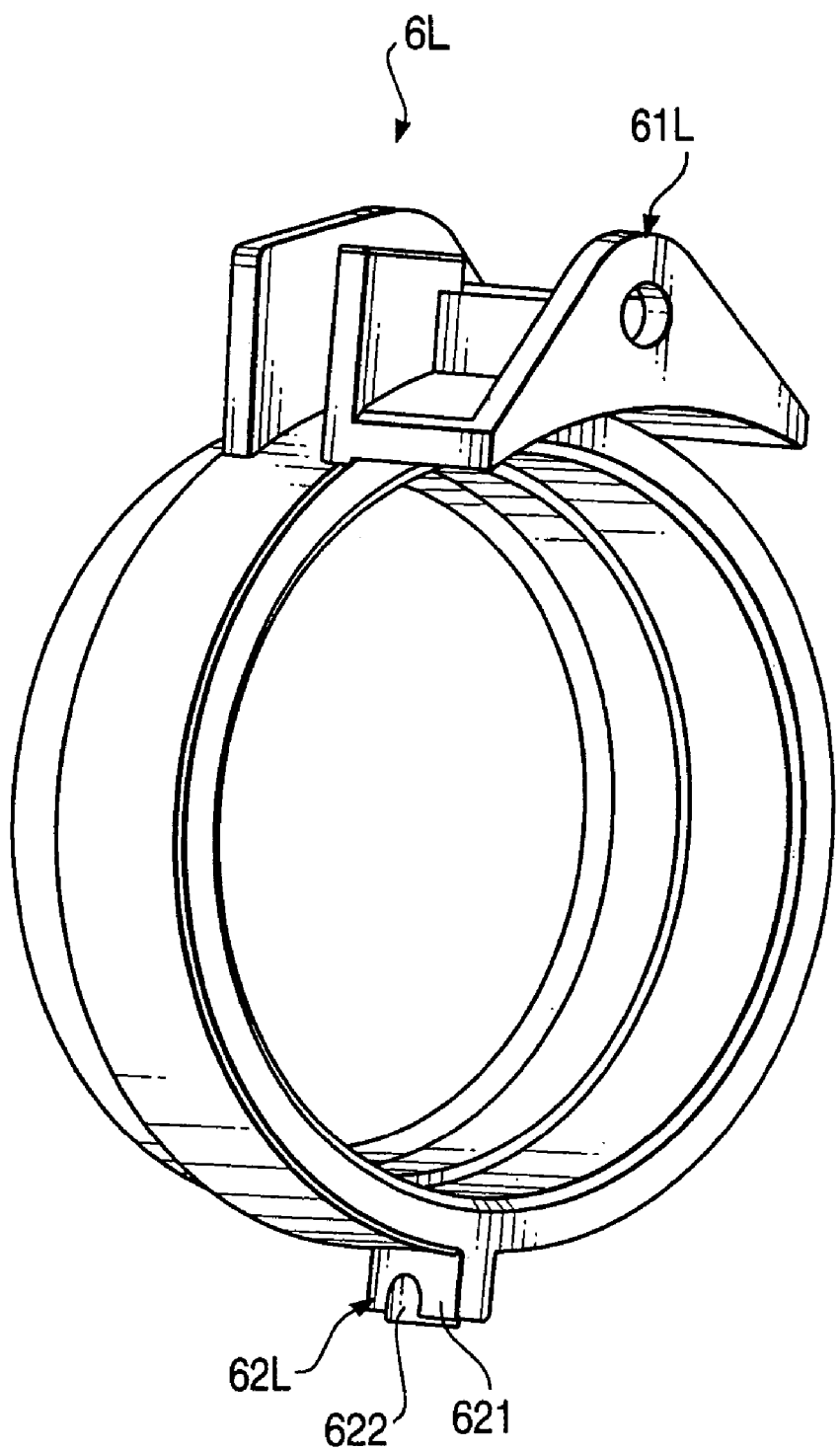
FIG. 9 is a perspective view showing a lens frame for retaining an objective optical system of the binoculars shown in FIG. 1.
Figure 10:
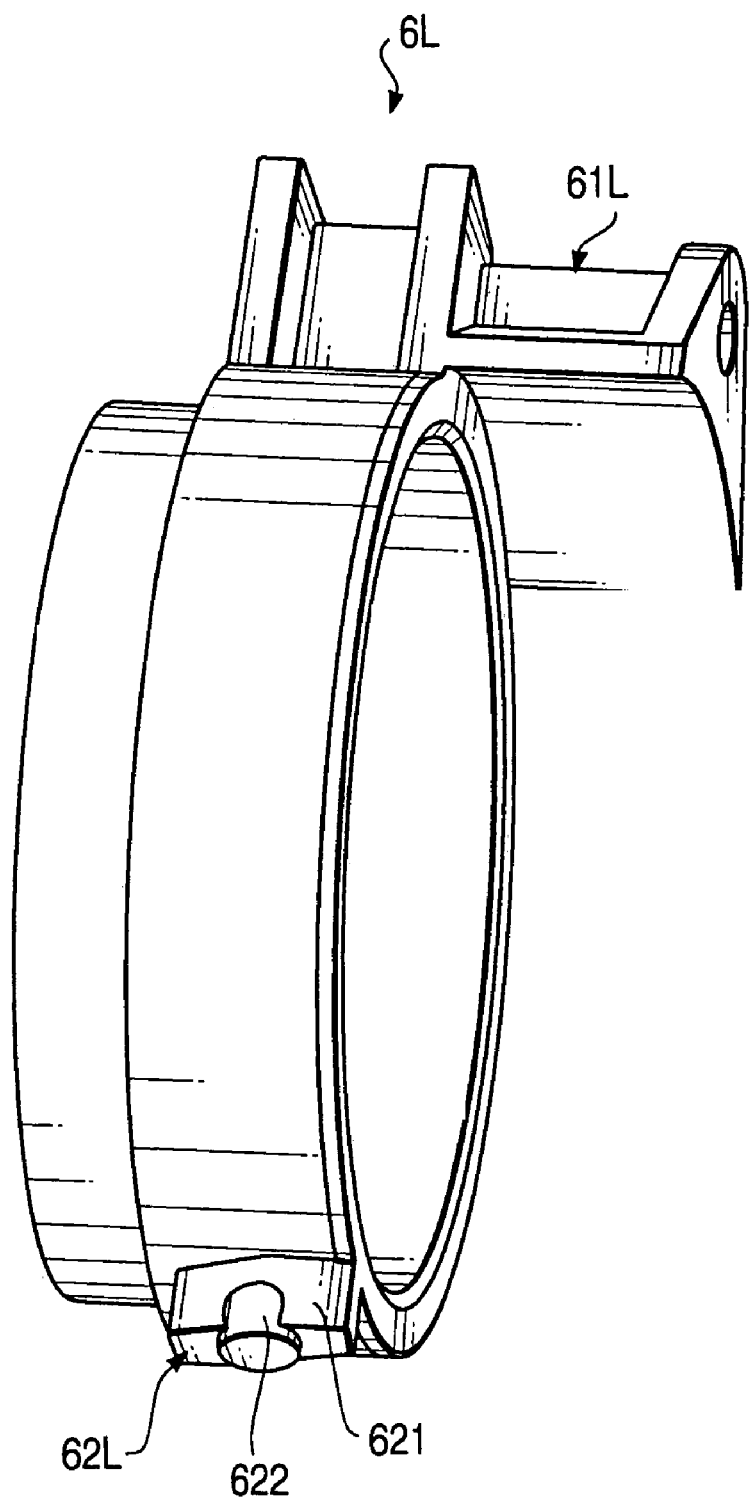
FIG. 10 is a perspective view showing a lens frame for retaining an objective optical system of the binoculars shown in FIG. 1.
Figure 11A:
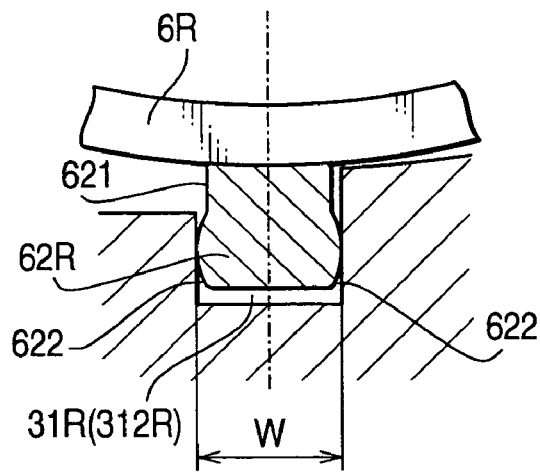
FIG. 11A is an enlarged view showing a projection of the lens frame of the binoculars shown in FIG. 1 and a guide groove into which the projection is inserted in the infinity focused state as in FIG. 3.
Figure 11B:
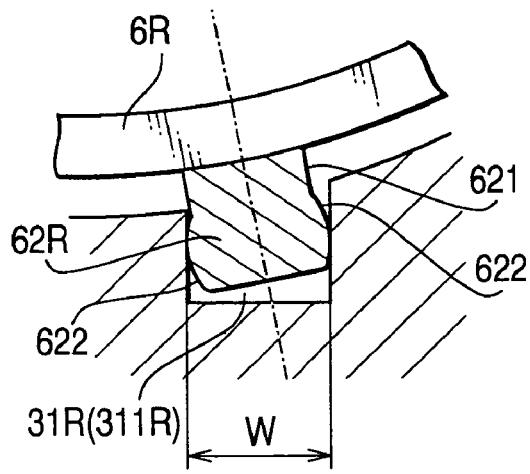
FIG. 11B is an enlarged view showing a projection of the lens frame of the binoculars shown in FIG. 1 and a guide groove into which the projection is inserted in the shortest distance focused state as in FIG. 6.
Figure 12A:
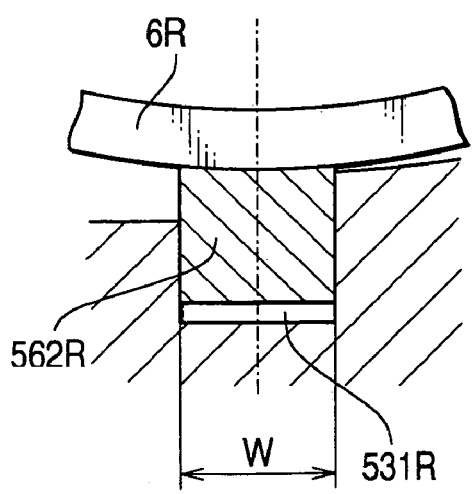
FIGS. 12A and 12B show an enlarged view showing a projection of a lens frame in a comparative example and a guide groove into which the projection is inserted.
Figure 12B:
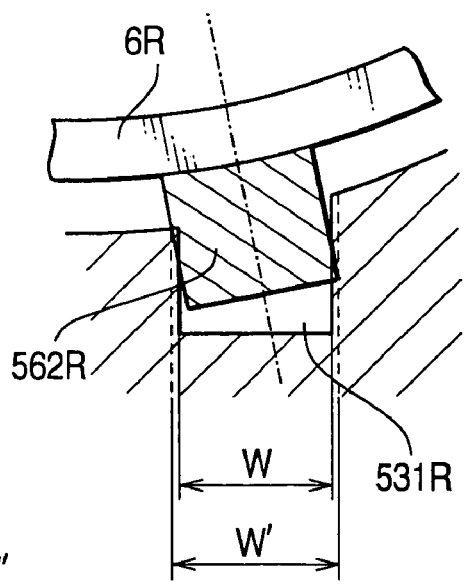

Each of FIG. 9 and FIG. 10 is a perspective view showing the lens frame 6R (6L) that retains the objective optical system 21R (21L) of the binoculars shown in FIG. 1. FIGS. 11A and 11B are enlarged views of the projection 62R (62L) of the lens frame 6R (6L) of the binoculars shown in FIG. 1 and the guide rail (groove) 31R (31L) into which the projection 6R (6L) is inserted, in the infinity focused state (FIG. 11A), and in the shortest distance focused state (FIG. 11B). FIGS. 12A and 12B are enlarged views showing a projection 562R of the lens frame 6R and a guide groove 531R into which the projection 562R is inserted in a comparative example.

As shown in FIGS. 9 and 10, the projection 62L of the lens frame 6L has a thinner plate-shaped portion 621 whose thickness is less than the width W of the guide groove 31L, and a spherical portion 622 spherically swelling from both sides of the plate-shaped portion 621. In FIGS. 9 and 10, the projection 62L of the left side lens frame 6L is representatively shown. The projection 62R of the right side lens frame 6R has a similar structure.

The spherical portions 622 in the projections 62L and 62R are brought into contact with the inner surfaces of the guide rails (grooves) 31L and 31R (see FIG. 11). A pair of the spherical portions 622 on both sides of the plate-shaped portion 621 are composed of a part of a sphere whose diameter is equal to the width W of the guide rails 31L and 31R. That is, the radius of curvature of the spherical portion 622 is approximately one half of the width W of the guide rails 31L and 31R. In FIGS. 11A and 11B, the right side projection 62R is representatively shown. The left side projection 62L has a similar structure.

The thickness of the plate-shaped portions 621 of the projections 62L and 62R is made thinner than the width W of the guide rails 31L and 31R. Therefore, the plate shaped portions 621 are not brought into contact with the inner surfaces of the guide rails 31L and 31R. In particular, as shown in FIG. 10, the plate-shaped portions 621 are configured to be thinner at a position farther from the spherical portion 622. Therefore, the plate-shaped portions 621 are not brought into contact with the inner surfaces of the guide rails 31L and 31R at points where the inclination angles of the guide rails 31L and 31R change as in the boundary points between the inclination portions 311L and 311R and the parallel portions 312L and 312R.

As described above, the projections 62L and 62R are configured such that portions of the projections 62L and 62R contacting the inner surfaces of the guiding rails 31L and 31R are formed as spherical surfaces. Thus, as is understood by comparing FIG. 11A with FIG. 11B, the width W of the guide rails 31L and 31R necessary for the projections 62L and 62R to be inserted therein without any play remains constant regardless of the inclination angles of the projections 62L and 62R. Therefore, it is possible to make the width W of the guide rails 31L and 31R constant along the lengthwise direction. Accordingly, processing and punching (formation) of the guide rails 31L and 31R can easily be carried out, and thus, the guide rails 31L and 31R can easily be manufactured, and the manufacturing costs thereof can be reduced.

Further, since the width W of the guide rails 31L and 31R is made constant, it is possible to form the guide rails 31L and 31R in an accurate shape and at accurate dimensions. As a result, play hardly occurs in the left and right directions of the projections 62L and 62R in the guide rails 31L and 31R. Therefore, the play of the objective optical systems 21L and 21R in the left and right directions can be decreased when the objective optical systems move forward and backward. With the above-described configuration, it is possible to compensate for the convergence value at a high accuracy.

FIGS. 12A and 12B show the comparative example corresponding to the structure illustrated in FIGS. 11A and 11B. As is understood from FIGS. 12A and 12B, if the projection 562R (562L) does not have a spherical portion, it is necessary that the guide rail (groove) 531L (531R) has a width of W' which is wider than the width W of the first embodiment at a portion where the inclination angle of the projection 562L (562R) increases. Therefore, if the spherical portion is not formed on the protrusion 562R (562L), it is necessary that the width of the guide rail 531L (531R) is gradually changed in the lengthwise direction. Accordingly, processing and punching of the guide rails 31L and 31R are made difficult and complicated, and it becomes difficult to produce such a guide rail (groove). Therefore, according to the configuration as shown in FIGS. 12A and 12B, the manufacturing cost is increased. In addition, since the projection 562L (562R) is subjected to provide play in the left and right directions in the guide rail 531L (531R), unless the width of the guide rail 531L (531R) accurately changes in accordance with the inclination angle of the projection 562L (562R), unintended play is provided to the objective optical systems in the left and right directions. In such a case, it is difficult to accurately compensate for the convergence value.

Further, in the first embodiment, since the projections 62L and 62R are not made simply spherical but the plate-shaped portions 621 are provided on both sides of the spherical portions 622, the strength of the projections 62L and 62R is increased. That is, the plate-shaped portions 621 function as reinforcement parts to enhance the strength of the projections 62L and 62R. Therefore, the strength of the projections 62L and 62R is increased with remaining the radius of curvature of the spherical portion 622 and width W of the guide grooves 31L and 31R relatively small. Therefore, the durability of the projections 62L and 62R can be enhanced, and even if the binoculars 1 are used for ages, it is ensured that the projections 62L and 62R are prevented from being broken, and further, downsizing of the binoculars 1 can be realized.

As shown in FIGS. 3 and 6, in the first embodiment, when viewed from the directions of the optical axes $O_{1L}$ and $O_{1R}$ of the objective optical systems 21L and 21R, the distance from the center of the focusing ring 51 to the centers of the guide shafts 11L and 11R is shorter than the distance from the center of the focusing ring 51 to the projections 62L and 62R. Accordingly, the vane 53 is located near the guide shafts 11L and 11R, and the arms 532L and 532R of the vane 53 are engaged with the lens frames 6L and 6R in the vicinity of the guide shafts 11L and 11R. Therefore, when the focusing ring 51 is turned, respective members will not be twisted or distorted and/or friction among respective members will not be caused. A rotational force of the focusing ring 51 is directly transmitted from the vane 53 to the lens frames 6L and 6R, and the objective optical systems 21L and 21R can be moved along the guide shaft 11L and 11R smoothly at a high accuracy. Therefore, the focusing accuracy and convergence value compensating accuracy can be improved.

Further, in the illustrated construction in FIGS. 3 and 6, when viewed from the directions of the optical axes $O_{1L}$ and $O_{1R}$ of the objective optical systems 21L and 21R, the guide shafts 11L and 11R are located at substantially the same height as that of the focusing ring 51 with respect to the vertical direction of the binoculars 1. With this configuration, it is possible to minimize the lengths of the arms 532L and 532R of the vane 53, and thus, the above-described effects can be remarkably exhibited, and excellent focusing accuracy and convergence value compensating accuracy can be obtained.

With such a configuration, in comparison with a roof prism type binoculars in which the distance between optical axes of both objective optical systems is equal to the distance between the optical axes of both eyepiece optical systems, and binoculars (Zeiss type and Bausch & Lomb type binoculars) in which the distance between the optical axes of both objective optical systems is larger than the distance between the optical axes of both eyepiece optical systems, a displacement amount of the objective optical systems 21L and 21R necessary for compensating for the convergence value can be smaller. The reason will be described below with reference to FIG. 7.

In FIG. 7, only the right side optical system is illustrated. Although omitted, the left side optical system has the same configuration as the right side one. In FIG. 7, the position of the right side objective optical system 100R for observing an object at the infinity is shown by a solid line. The objective optical system 100R is moved closer to the center line of the binoculars in order to observe an object 200 at a finite distance a (adjustment value: a<0) from the objective optical system 100R in a state where the convergence value is compensated, and it is necessary that the objective optical system 100R is to be moved to the position indicated by a broken line. In this case, the movement distance y of the objective optical system 100R, which is obtained from FIG. 7 and an image formation formula 1/b=1/a+1/f, is represented by an expression below:

$$y = b \times \tan\theta$$
$$= \{f \times a/(a+f)\} \times \tan\theta$$
$$= \{f \times a/(a+f)\} \times D/(-a+b)$$
$$= D \times [f \times a/(a+f)/\{-a+f \times a/(a+f)\}],$$

where, $f$ represents the focusing distance of the objective optical system 100R, 2D represents the distance between the optical axes of both objective optical systems, 2θ represents a convergence angle, b denotes the distance from the objective optical systems to the image forming position of an object 200 by the objective optical system 100R (b>0).

That is, the movement distance y of the objective optical system 100R necessary to compensate for the convergence value is increased in proportion to D. In other words, as the distance between the optical axes of both objective optical systems is shorter, the displacement value of the objective optical systems necessary to compensate for the convergence value can be decreased.

In the binoculars 1 according to the first embodiment, since the distance between the optical axes $O_{1L}$ and $O_{1R}$ of the objective optical systems 21L and 21R is small, as described above, it is sufficient to move the objective optical systems 21L and 21R only slightly in the direction perpendicular to the optical axes $O_{1L}$ and $O_{1R}$ to compensate for the convergence value. Therefore, it is possible to incorporate a convergence value compensating mechanism without increasing the scale of the main body 3, and the entire binoculars 1 can be made compact.

Further, only slight movement distance of the objective optical systems 21L and 21R is sufficient for the convergence value compensation. Therefore, with an objective optical system turning system in which the objective optical systems 21L and 21R are turned to change the distance between the optical axes $O_{1L}$ and $O_{1R}$, the compensation for the convergence value can be realized. The objective optical system turning system has a simple structure, which contributes to a decrease in manufacturing costs thereof.

Second Embodiment

Figure 13:
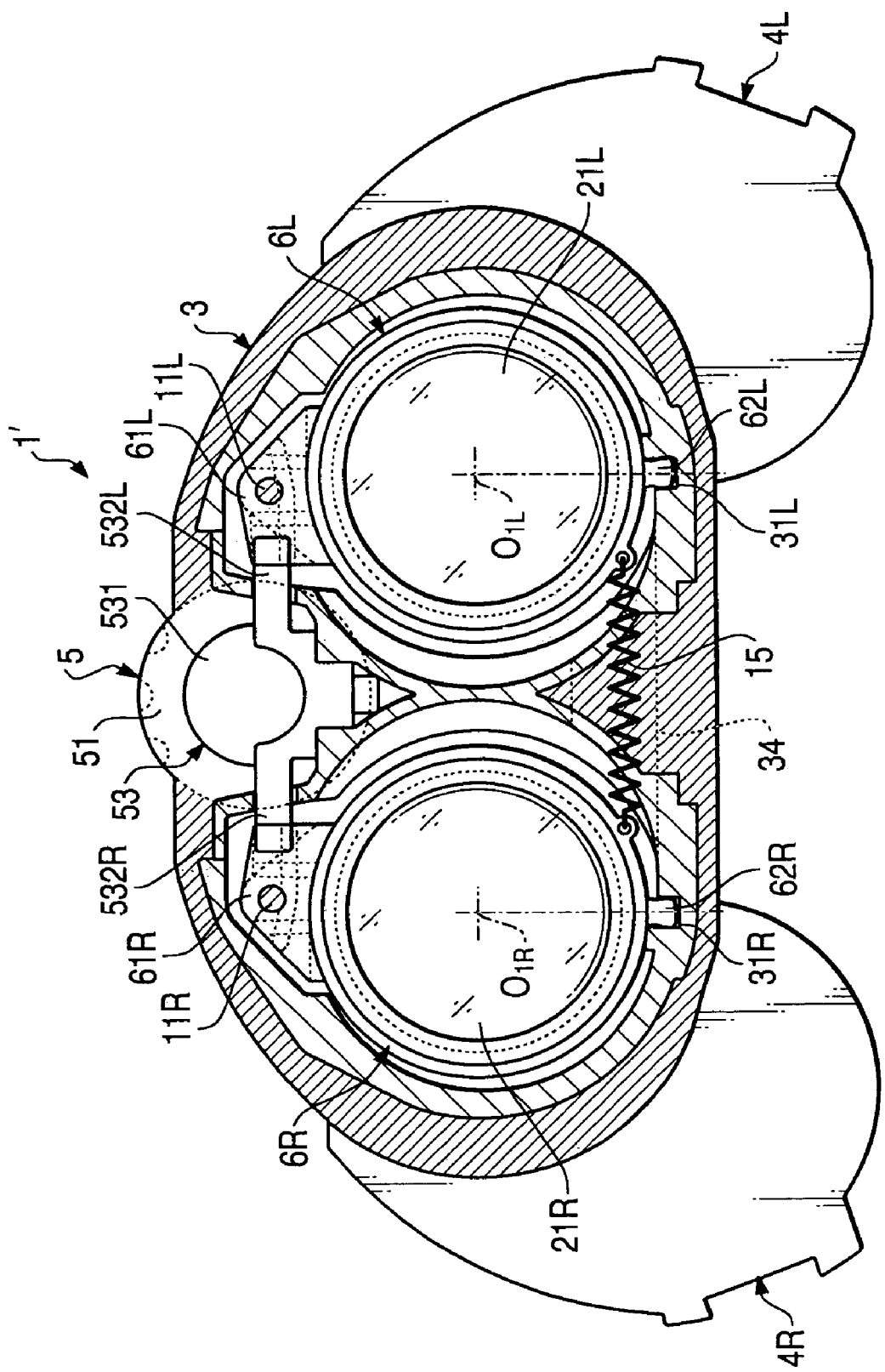
FIG. 13 is a sectional front view showing binoculars according to a second embodiment of the invention.

FIG. 13 is a sectional front view showing binoculars 1' according to a second embodiment of the invention. In the description regarding the second embodiment, only the differences with respect to the first embodiment will be described, and description regarding the parts which are similar to those of the first embodiment will be omitted.

In the binoculars 1' shown in FIG. 13, a tension spring 15 is provided between the lens frames 6L and 6R of the objective optical systems 21L and 21R. A through hole 34, into which the tension spring 15 is inserted, is formed on the main body 3. Since the lens frames 6L and 6R are urged such that they approach each other by the tension spring 15, the projections 62L and 62R are press-contacted onto the sides of the guide rails 31L and 31R by the urging force of the tension spring 15.

With such a construction, a play of the projections 62L and 62R in the left and right directions with respect to the guide rails 31L and 31R is removed, and a play of the objective optical systems 21L and 21R can also be removed, which further improves the accuracy in convergence value compensation.

It should be noted that, in the construction shown in FIG. 13, the guide rails 31L and 31R are composed of grooves as in the first embodiment. However, it is not necessary that the guide rails 31L and 31R are grooves in the second embodiment, but the guide rails 31L and 31R may be composed of stepped portions each having a surface which the projections 62L and 62R are contacted.

In the above-described embodiments, the guide shafts are located above the objective optical systems while the guide rails are located below the objective optical systems. However, the guide shafts and guide rails may be arranged oppositely.

Alternatively, the binoculars may be configured such that the guide rails are provided both above and below the objective optical systems without the guide shafts, and the objective optical systems are moved in a direction perpendicular to the optical axes thereof as they are guided by the guide rails, whereby the distance between the optical axes is varied.

In the embodiments described above, each of the objective optical systems is composed of one lens group including two lenses, and focusing and convergence value compensation are carried out by moving the entirety of each objective optical system. However, the invention need not be limited to such an objective optical system and can be modified. For example, if each of the objective optical systems is composed of more than one lens groups, focusing and convergence value compensation may be carried out by moving a part of the lens groups constituting each objective optical system.

The present disclosure relates to the subject matters contained in Japanese Patent Applications No. 2004-032560, No. 2004-032562 and No. 2004-032563, all filed on Feb. 9, 2004. which are expressly incorporated herein by reference in their entireties.

What is claimed is:

1. Binoculars which include a pair of observation optical systems each having an objective optical system, an erecting optical system and an eyepiece optical system, the binoculars comprising:
    a pair of displaceble optical elements, which are at least parts of the objective optical systems, respectively;
    a focusing mechanism that is used to move the pair of displaceable optical elements for focusing;
    a pair of guide shafts corresponding to the pair of displaceable optical elements, each guide shaft of the pair of guide shafts being arranged in parallel with a corresponding displaceable optical element, each guide shaft of the pair of guide shaft guiding the corresponding displaceable optical element when moved by actuation of the focusing mechanism, each guide shaft of the pair of guide shafts serving as a turning center of the corresponding displaceable optical element;
    a pair of engaging portions formed on a pair of frames that hold the pair of displaceable optical elements, respectively; and
    a pair of guide grooves provided with respect to the pair of displaceable optical elements, respectively, the pair of engaging portions being inserted in and slidably engaged with te pair of guide grooves, respectively, the pair of guide grooves having inclined portions that incline with respect to the optical axes of the pair of displaceable optical elements at at least parts thereof, respectively,
    wherein, when the pair of displaceable optical elements are moved for focusing with the pair of engaging portions being engaged with the inclined portions of the pair of guide grooves, respectively, a distance between the optical axes of the pair of displaceable optical elements changes, thereby a convergence value being compensated, and
    wherein the pair of engaging portions have a pair of projections formed on the pair of frames, respectively, said projections formed to have substantially spherical surfaces at portions which contact inner surfaces of the guide grooves, respectively.

2. The binoculars according to claim 1,
    wherein each of the pair of observation optical system is configured such that an incidence side optical axism, and an emission side optical axis with respect to the erecting optical system are shifted from each other by a predetermined distance,
    wherein the binoculars further includes:
    a left barrel containing the left eyepiece optical system and the left erecting optical system, the left barrel being turnable, with respect to a main body, about the left incidence side optical axis of the eyepiece optical system; and
    a right barrel containing the right eyepiece optical system and the right erecting optical system, the right barrel being trunable, with respect to the main body, about the right incidence side optical axis of the eyepiece optical system, and
    wherein the distance between the emission side optical axes of the pair of eyepiece optical system is made adjustable by turning the left barrel and right barrel with respect to the main body.

3. The binoculars according to claim 1, wherein each of the pair of guide grooves has a constant width along a lengthwise direction thereof.

4. The binoculars according to claim 1, wherein the cross-sectional inner shape on a plane perpendicular to a lengthwise direction of each of the pair of guide grooves is rectanglar.

5. The binoculars according to claim 1, wherein each of the pair of projections has a reinforcement part that enhances the strength of each projection at sides of the spherical surface.

6. The binoculars according to claim 1,
    wherein each of the pair of projections includes a plate-shaped portion whose thickness is thinner than the width of corresponding guide groove and a spherical portionswelling to be spherical from both sides of the plate-shaped portion, and
    wherein the plate-shape portion is shaped not to contact the inner surface of the guide groove, the spherical portion contacting inner surface of the corresponding guide groove.

7. The binoculars according to claim 1, wherein, when viewed along the optical axis of the pair of objective optical systems, lines connecting the engaging portions and centers of the pair of guide shafts pass in the vicinities of the centers of the pair of displaceable optical elements, respectively.

8. The binoculars according to claim 7,
    wherein each of the pair of observation optical systems is configured such that an incidence side optical axis of the eyepiece optical system, with respect to the erecting optical system, and an emission side optical axis of the eyepiece optical system are shifted from each other by a predetermined distance,
    wherein the binoculars further include:
    a left barrel containing the left eyepiece optical system and the left erecting optical system, the left barrel being turnable, with respect to the main body, about the left incidence side optical axis of the eyepiece optical system; and
    a right barrel containing the right eyepiece optical system and the right erecting optical system, the right barrel being turnable, with respect to the main body, about the right incidence side optical axis of the eyepiece optical system, and
    wherein the distance between the emission side optical axes of the pair of eyepiece optical systems is made adjustable by turning the left barrel and right barrel with respect to the main body.

9. The binoculars according to claim 7,
wherein, when viewed in the optical axes direction of the objective optical systems, a distance from the center of each of the pair of displaceable optical elements to the center of the corresponding one of the pair of guide shafts is longer than a distance from the center of the displaceable optical element to the engagement portion.

10. The binoculars according to claim 7,
wherein the focusing mechanism includes a focusing ring which is manually operable; and
wherein, when viewed in the optical axis direction of each of the objective optical systems, a distance from the center of the focusing ring to the center of corresponding one of the pair of guide shafts is shorter than a distance from the center of the focusing ring to the engagement portion.

11. The binoculars according to claim 7,
wherein the focusing mechanism includes a focusing ring which is manually operable; and
wherein, when viewed in the optical axis direction of the pair of objective optical systems, the pair of guide shafts are arranged at substantially the same height as that of the focusing ring with respect to the vertical direction of the binoculars.

* * * * *